United States Patent [19]
Totani et al.

[11] Patent Number: 5,597,588
[45] Date of Patent: Jan. 28, 1997

[54] BARREL TEMPERATURE CONTROL SYSTEM FOR INJECTION MOLDING MACHINE

[75] Inventors: Tsuginobu Totani; Kazuhiro Tashiro; Shogo Ishibashi; Kiyoshi Sasaki, all of Shizuoka-ken, Japan

[73] Assignee: Toshiba Kikai Kabushiki Kaisha, Tokyo, Japan

[21] Appl. No.: 413,157

[22] Filed: Mar. 29, 1995

[30] Foreign Application Priority Data

Mar. 30, 1994 [JP] Japan .................................. 6-061620

[51] Int. Cl.⁶ .................................................. B29C 45/78
[52] U.S. Cl. ................................................. 425/143; 425/144
[58] Field of Search ....................................... 425/143, 144

[56] References Cited

U.S. PATENT DOCUMENTS 5,456,870 10/1995 Bulgrin ..................................... 425/143

*Primary Examiner*—Tim Heitbrink
*Attorney, Agent, or Firm*—Finnegan, Henderson, Farabow, Garrett & Dunner, L.L.P.

[57] ABSTRACT

The barrel temperature control apparatus for an injection molding machine can execute the barrel temperature control in such a way as to optimize the disturbance suppression characteristics. The temperature control section 7 comprises the manipulated variable addition and subtraction section 14 at the rear stage of the PiD control section 12 in such a way that the barrel temperature of the injection molding machine 1 can be controlled under both feedback and feed-forward. Further, when the same products are molded continuously, the barrel temperature is feed-forward controlled on the basis of the learned change manipulated variable.

4 Claims, 9 Drawing Sheets

BARREL TEMPERATURE CONTROL SYSTEM FOR INJECTION MOLDING MACHINE

BACKGROUND OF THE INVENTION

1. Field of the Invention

The present invention relates to a barrel temperature control apparatus for an injection molding machine.

2. Description of the Prior Art

Conventionally, when resin supplied into a barrel of an injection molding machine is mixed and melted for injection molding, it has been aimed to improve the product quality (yield) at the molding start and further to prevent the resin in the barrel from being deteriorated at the molding end, both by controlling the temperature of the barrel.

For instance, in a feedback control system as shown in FIG. 1, a barrel of an injection molding machine is heated by an injection molding machine heater section 201; the barrel temperature detected by a temperature detecting section 202 is fed back to a subtraction point 203; a temperature deviation between the detected temperature and a target temperature is obtained; and this temperature deviation and manipulated variables based upon the temperature deviation and the PiD parameters of a controller 204 are inputted to the injection molding machine heater section 201 so that the barrel temperature at the injection molding machine heater section 201 is feedback controlled at each start and stop of the injection molding.

However, where the feedback control system is formed as with tile case of the conventional art system as described above, if the parameters are not so adjusted by the controller 204 that the disturbance suppression characteristics can be optimized at all the times, whenever the injection molding operation is shifted from the molding stop status to the molding start status or from the molding status to the molding stop status, the following problems arise:

That is, when non-melted resin is supplied into the barrel after the injection molding operation shifts from the molding stop status to the molding start status and the plasticizing operation starts, if the disturbance suppression is not sufficient, since the barrel temperature drops abruptly, a long time is required until the barrel temperature restores the original stable target temperature, with the result that it is impossible to obtain a stable molding status. As a result, the quality of the molded products deteriorates and thereby the molded products must be disuse to that extent; that is, resin and time are both wasted.

Further, when the supply of non-melted resin into the barrel stops after the injection molding operation shifts from the molding status to the molding stop status and the plasticizing operation stops in the barrel, if the disturbance suppression is not sufficient, since the barrel temperature rises abruptly, a long time is required until the barrel temperature restores the original stable target temperature, so that the resin temperature within the barrel rises to a temperature beyond a predetermined temperature range. As a result the resin is deteriorated and dissolved.

In practice, however, it is impossible to adjust the parameters in the controller 204 in such a way that the disturbance suppression characteristics can be always optimized. Therefore, conventionally, it has been impossible to improve the product quality at the molding start and to prevent the resin in the barrel from being deteriorated under satisfactory conditions.

SUMMARY OF THE INVENTION

With these problems in mind therefore, it is the object of the present invention to provide a barrel temperature control apparatus for an injection molding machine which can control barrel temperature at all times so that disturbance suppression characteristics can be optimized.

To achieve the above-mentioned object, the present invention provides, as shown in FIG. 2, a barrel temperature control apparatus for an injection molding machine 102, in which injection molding operation for mixing and melting resin supplied into a barrel is sequence-controlled, having: a barrel heater 103 for heating the barrel; temperature detecting means 104 for detecting temperature of the barrel; and barrel temperature control means 105 for feed back of detected temperature of the barrel to obtain a temperature deviation between the detected temperature and a target temperature, and feedback controlling temperature of the barrel heated by operating barrel heater 103 on the basis of manipulated variable according to the obtained temperature deviation, characterized in that: the barrel temperature control means 105 comprises: molding operation discriminating means 106 for discriminating start and stop of injection molding on the basis of the sequence-controlled injection molding operation; first feed-forward control means 107 for estimating disturbance rate on the basis of increase and decrease of temperature fluctuations of the barrel due to disturbance at an initial response stage to the barrel heater 103 at each start and stop of the injection molding, and for feed-forward controlling the temperature of the barrel heated by operating the barrel heater 103 on the basis of the estimated change manipulated variable according to the estimated disturbance rate; second feed-forward control means 108 for learning the manipulated variables for the barrel heater 103 in operation of the injection molding and for the barrel heater 103 at stop of the injection molding, and for feed-forward controlling the temperature of the barrel heated by operating the barrel heater 103 on the basis of the obtained learned change manipulated variable; molding condition discriminating means 109 for discriminating whether current injection molding conditions and preceding injection molding conditions are the same or not in the injection molding operation on the basis of the sequence-controlled injection molding operation; and change manipulated variable rate selecting means 110 for selecting said second feed-forward control means 108 when the current injection molding conditions are the same as those of the preceding injection molding conditions, and selecting said first feed-forward control means 107 when the current injection molding conditions are not the same as those of the preceding injection molding conditions. Further, 101 denotes a sequencer.

In the barrel temperature control apparatus for an injection molding machine according to the present invention, so that the temperature barrel heated by the barrel heater 103 can be feed-forward controlled by any one of the first feed-forward control means 107 and the second feed-forward control means 108, while feedback controlling the temperature barrel heated by the barrel heater 103, there are provided the molding operation discriminating means 106 for discriminating start and stop of injection molding on the basis of the sequence-controlled injection molding operation; molding condition discriminating means 109 for discriminating whether current injection molding conditions and preceding injection molding conditions are the same or not in the injection molding operation on the basis of the sequence-controlled injection molding operation; and change manipulated variable rate selecting means 110 for selecting said second feed-forward control means 108 when the current injection molding conditions are the same as those of the preceding injection molding conditions, and selecting said first feed-forward control means 107 when the current injection molding conditions are not the same as those of the preceding injection molding conditions.

Further, when the molding condition discriminating means 109 discriminates that the current injection molding conditions is not the same as the preceding injection molding conditions in the injection molding operation, the first feed-forward control means 107 estimates the disturbance value on the basis of increase and decrease of temperature fluctuations of the barrel due to disturbance at an initial response stage to the barrel heater 103 at each start and stop of the injection molding, and feed-forward controls the temperature barrel heated by the barrel heater 103 on the basis of the estimated change manipulated variable according to the estimated disturbance value.

Further, when the molding condition discriminating means 109 discriminates that the current injection molding conditions match the preceding injection molding conditions in the injection molding operation, the second feed-forward control means 108 learns the manipulated variables for the barrel heater 103 in operation of the injection molding and for the barrel heater 103 at stop of the injection molding, and feed-forward controls the temperature barrel heated by the barrel heater 103 on the basis of the obtained learned change manipulated variable.

DETAILED DESCRIPTION OF THE EMBODIMENTS

Figure 3:
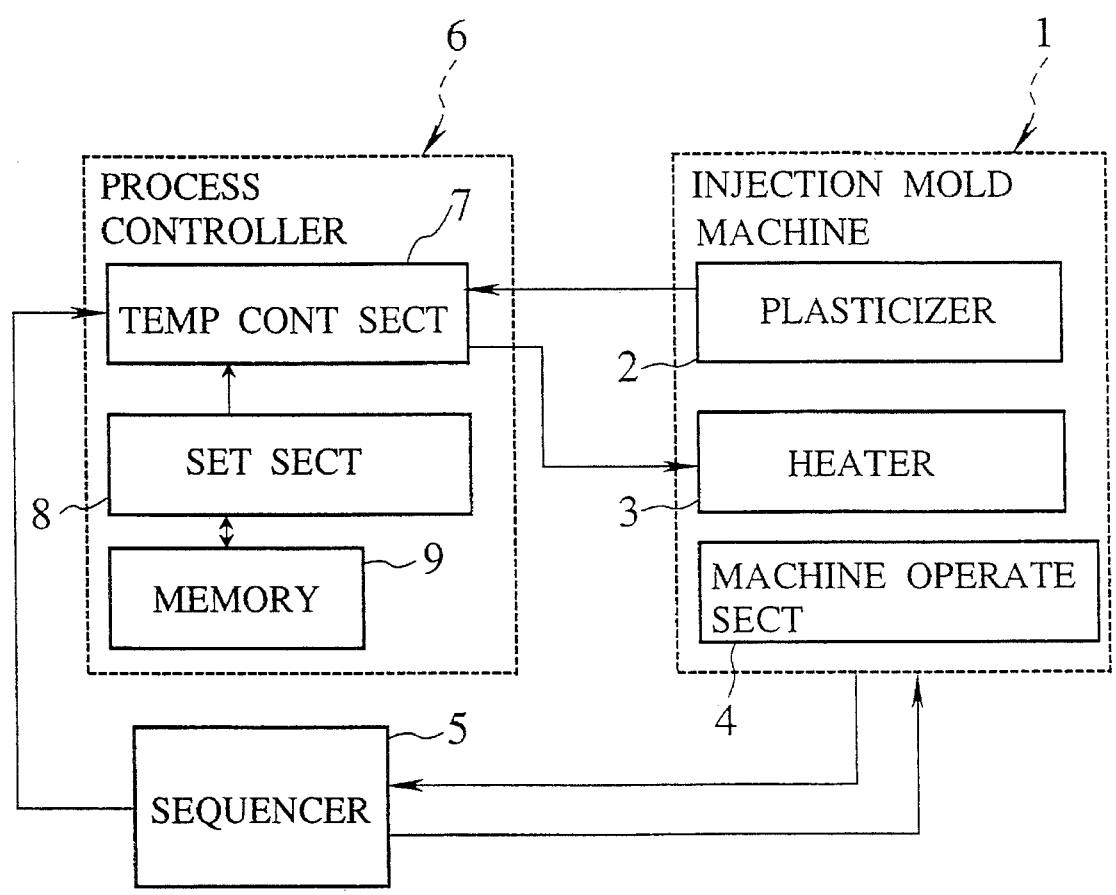
FIG. 3 is a schematic block diagram showing an embodiment of tile barrel temperature control apparatus, to which the present invention is applied.

FIG. 3 is a schematic block diagram showing an embodiment of the barrel temperature control apparatus, to which the present invention is applied.

The injection molding machine 1 has a plasticizing apparatus 2, a heating section 3, and a mechanical operating section 4 as an essential section. The respective operations of these sections are sequence controlled by a sequencer 5.

The sequencer 5 controls the sequence of the injection molding operation of the injection molding machine 1, and transmits the sequence control information to a process controller 6.

The process controller 6 comprises a temperature control section 7, a setting section 8, and a memory 9. The temperature control section 7 obtains a temperature deviation between the barrel temperature detected by the plasticizing apparatus 2 of the injection molding machine 1 and a target temperature. Further, the temperature control section 7 feedback-controls the heating section 3 of the injection molding machine 1 according to the obtained temperature deviation, and further feed-forward controls the heating section 3 of the injection molding machine 1 at timing of signals of the sequencer 5 (described later).

Figure 4:
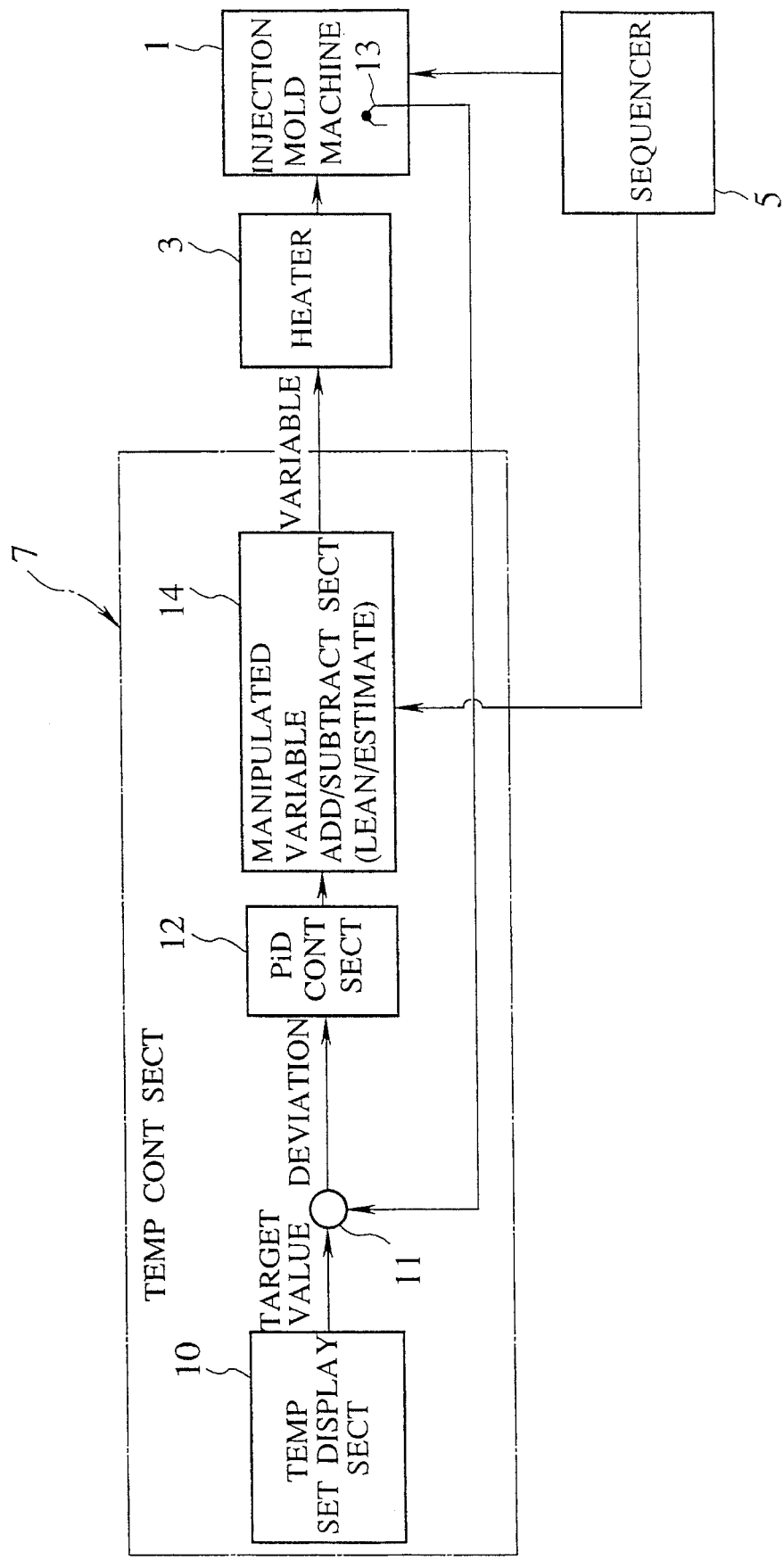
FIG. 4 is a detailed block diagram showing an entire system of the temperature control section of the process controller shown in FIG. 3.

FIG. 4 is a detailed block diagram showing the temperature control section 7 of the process controller 6 shown in FIG. 3.

As shown in FIG. 4, the temperature control section 7 includes a temperature setting and displaying section 10, a subtraction point 11, and a PiD control section 12. Therefore, the temperature control section 7 can feedback the barrel temperature detected by the barrel temperature detecting means 13 of the injection molding machine 1 to the subtraction point 11, in order to obtain the temperature deviation between the barrel temperature and the target temperature, and to PiD-feedback-control the heating section 3 of the injection molding machine 1 in accordance with the manipulated variable determined on the basis the temperature deviation and the PiD parameters of the PiD control section 12. Further, a manipulated variable addition and subtraction section 14 is provided at the rear stage of the PiD control section 12. This manipulated variable addition and subtraction section 14 is operated as molding operation discriminating means for discriminating start and stop of injection molding on the basis of the sequence-controlled injection molding operation sequence-controlled by the sequencer 5; as first feed-forward control means for estimating disturbance rate on the basis of increase and decrease of temperature fluctuations of the barrel due to disturbance at an initial response stage to the barrel heater 3 of the injection molding machine 1 at each start and stop of the injection molding, and for feed-forward controlling the temperature heated by the barrel heater 8 of the injection molding machine 1 on the basis of the estimated change manipulated variable according to the estimated disturbance rate; as second feed-forward control means for learning the manipulated variables for the barrel heater 3 of the injection molding machine 1 in operation of the injection molding and for the barrel heater 3 of the injection molding machine 1 at stop of the injection molding, and for feed-forward controlling the temperature heated by the barrel heater 3 of the injection molding machine 1 on the basis of the obtained learned change manipulated variable; as molding condition discriminating means for discriminating whether current injection molding conditions and preceding injection molding conditions are the same or not in the injection molding operation on the basis of the sequence-controlled injection molding operation sequence-controlled by the sequencer 5; and as change manipulated variable value selecting means for selecting said second feed-forward control means when the current injection molding conditions are the same as those of the preceding injection molding conditions, and selecting said first feed-forward control means when the current injection molding conditions are not the same as those of the preceding injection molding conditions. Owing to the above-mentioned respective operations, the estimated change manipulated variable or the learned change manipulated variable is added or subtracted to and from the manipulated variable outputted from the PiD control section 12 or the addition or the subtraction is omitted by the manipulated variable addition and subtraction section 14. Therefore, the temperature of the heater section 8 of the injection molding machine 1 can be controlled on the basis of the manipulated variable outputted by the manipulated variable addition and subtraction section 14.

Figure 1:
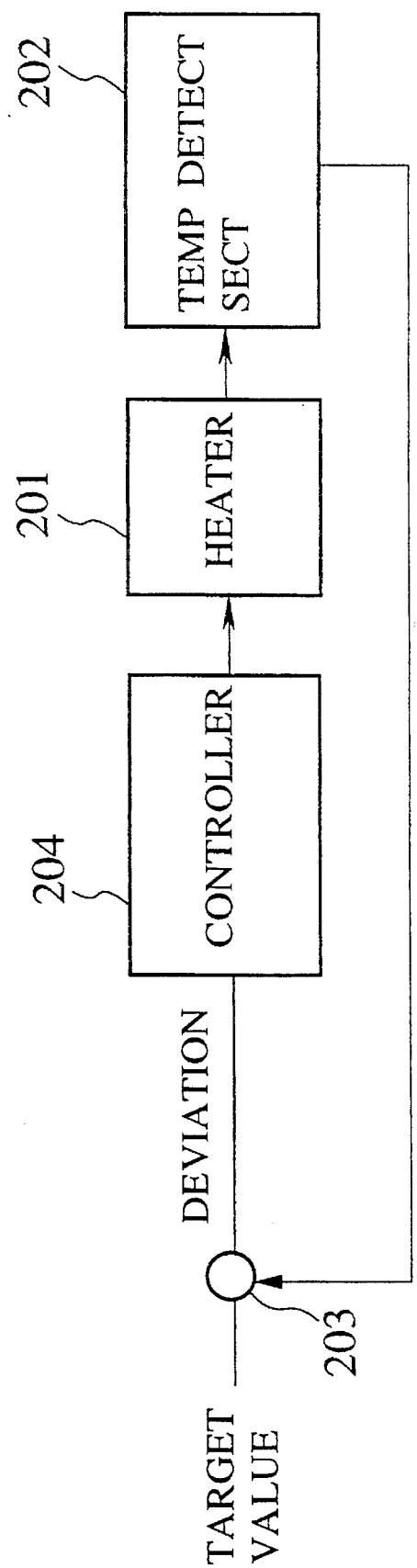
FIG. 1 is a schematic block diagram showing a prior art barrel temperature control apparatus.
Figure 2:
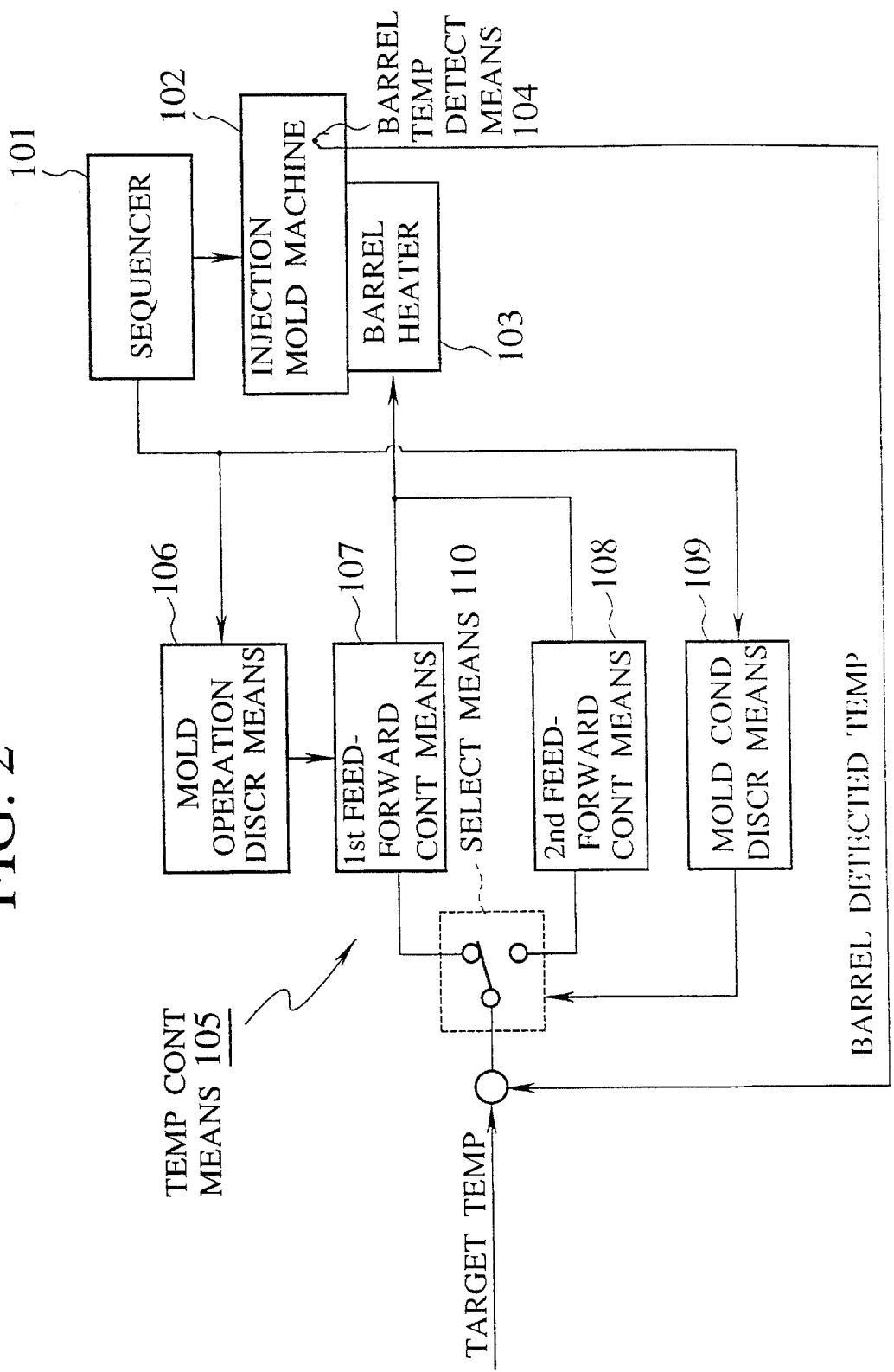
FIG. 2 is a diagram which corresponds to the claims according to the present invention.
Figure 5:
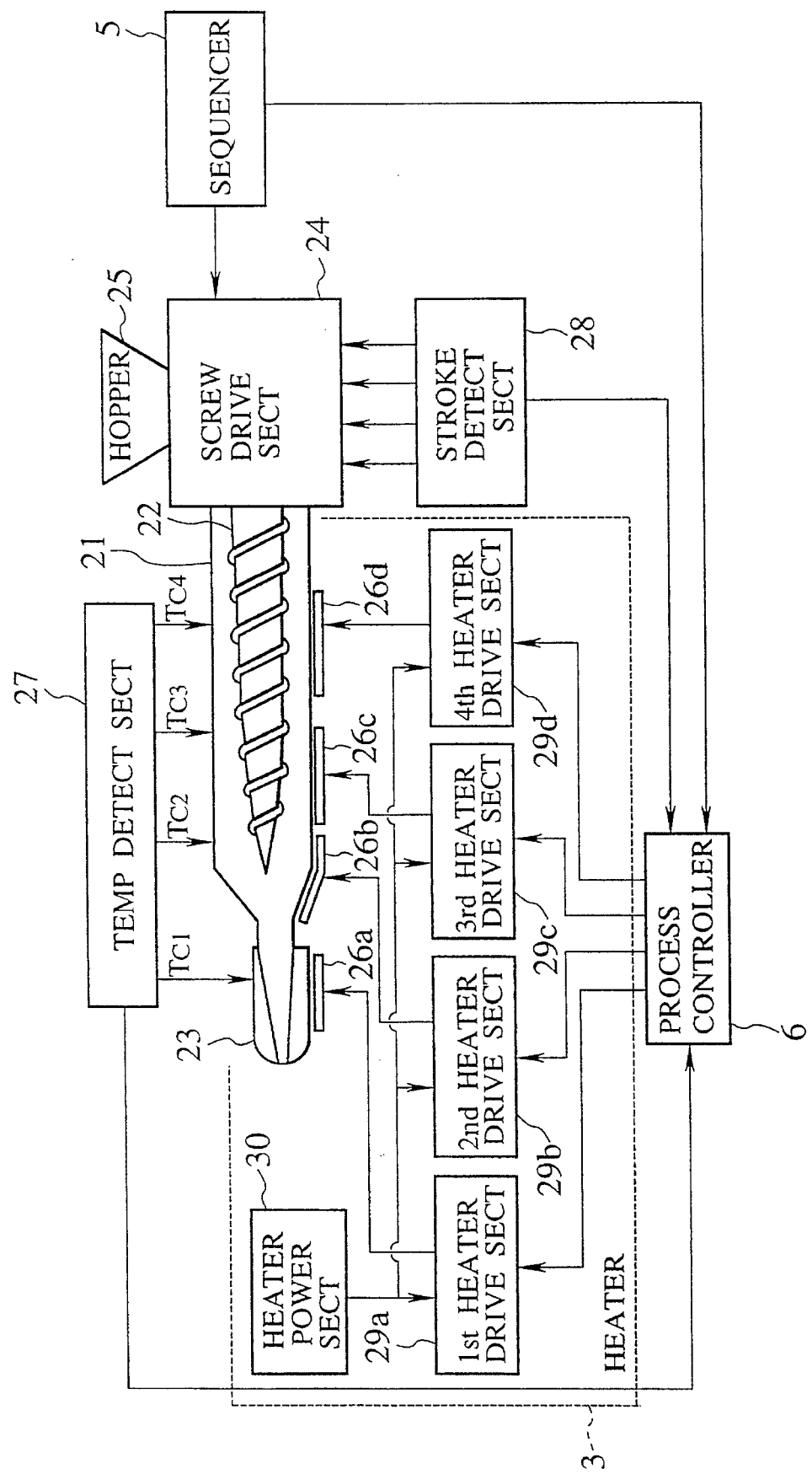
FIG. 5 is a detailed block diagram showing the respective sections of the injection molding machine shown in FIG. 3.

FIG. 5 shows a detailed system construction of the injection molding machine 1 shown in FIG. 2.

As shown in FIG. 5, in the injection molding machine 1, the plasticizing apparatus 2 has a barrel 21, a screw 22, a nozzle 23, a screw drive section 24, and a hopper 25. The resin supplied from the hopper 25 into the barrel 21 via the screw drive section 24 is mixed by the screw 22 being heated by the first to fourth heaters 26a to 26d of the heating section 3, so that the plasticized resin can be injected through the nozzle 23 into a product.

Here, the temperature detecting section 27 has four temperature points TC1 to TC4 at which barrel temperatures can be measured by four thermocouples arranged in the injection direction. The temperatures measured at these four points of the temperature detecting section 27 are feedbacked to the process controller 6 to obtain the temperature deviation from a target temperature, as already explained with reference FIG. 4. Further, the screw drive section 24 has a stroke detecting section 28 to detect the stroke of the screw 22 so that the process controller 6 detects the movement of the screw 22. Further, under control of the process controller 6, the first to fourth heater drive sections 29a to 29d pass current through the first to fourth heaters 26a to 26d from a heater power section 30 to heat the barrel 21. Further, the sequencer 5 sequence-controls the injection molding machine 1, as explained with reference to FIGS. 3 and 4.

Here, the method of determining the feed-forward value (FF value) by the disturbance estimation feed-forward control and learning feed-forward control performed by the barrel temperature control apparatus according to the present invention provided with the above-mentioned respective sections will be explained hereinbelow. Further, in the following description, FB denotes feedback.

(1) Disturbance estimation FF

The disturbance value is estimated at the initial response stage on the basis of increase or decrease of temperature fluctuations of barrel when unknown disturbance is loaded at each start and stop of the injection molding.

The estimation is made by multiplying the temperature change per sampling by a coefficient. At the maximum temperature change, the FF value is maximized, and then a half of the maximum FF value is determined when the temperature change begins to decrease (for prevention of overlap of FB and FF). After that, the FF value is kept.

(2) Learning FF

The FF value is used when the resin is molded again by unitization of a difference between before molding and during molding.

The current value Ud during molding is measured on the basis of the steady-state current value Ue at the molding stop of the molding machine.

On the basis of these data, (Ud–Ue) is added to the FF value at the molding start, and subtracted from the FF value at tile molding stop.

(3) Learning FF conditions

When being the same as the preceding molding conditions, the FF current value is added at the molding start.

Here, although the same conditions must be substantially decided on the basis of soak time (holding time), since the machine must be operated by one cycle, in order to determine the conditions before operating the machine, the following conditions are used (the items corresponding to the soak time are decided on the basis of the set values):

(a) Cycle time (TR)

From the set values TR1, TR3, and TR4,

TR=TR1+TR3+TR4 (decided as being the same if the fluctuations lie within + or –2.5%). However, TR1 denotes the time from injection start to injection end; TR3 denotes the time required for cooling; and TR4 denotes the time required to take off a molded product.

(b) Measured position LS5 (decided as being the same if the fluctuations lie within + or –2.5%).

(c) Measured revolution speed SRN (converted into circumferential speed) (decided as being the same if the fluctuations lie within + or –2.5).

(d) Temperature set value

Barrel temperature set value (decided as being the same if the fluctuations lie within + or –2.5%). Decided for each use zone.

The conditions (a) to (d) are discriminated as to whether being the same as the preceding molding conditions or not.

(4) Starting conditions

<FF is added>

When the conditions are decided as being the same as the preceding molding in Items (a) to (c) of (3) above and further when the preceding FF rate is present, FF I/O is turned on (a signal (measurement start+LS4 OFF) is formed by the sequence soft and used as a start signal).

<FF is subtracted>

When the FF rate has been added, FF I/O is turned off to release the added FF rate (when operated manually after automatic/semiautomatic operation and when a molding die has been changed).

Figure 6:
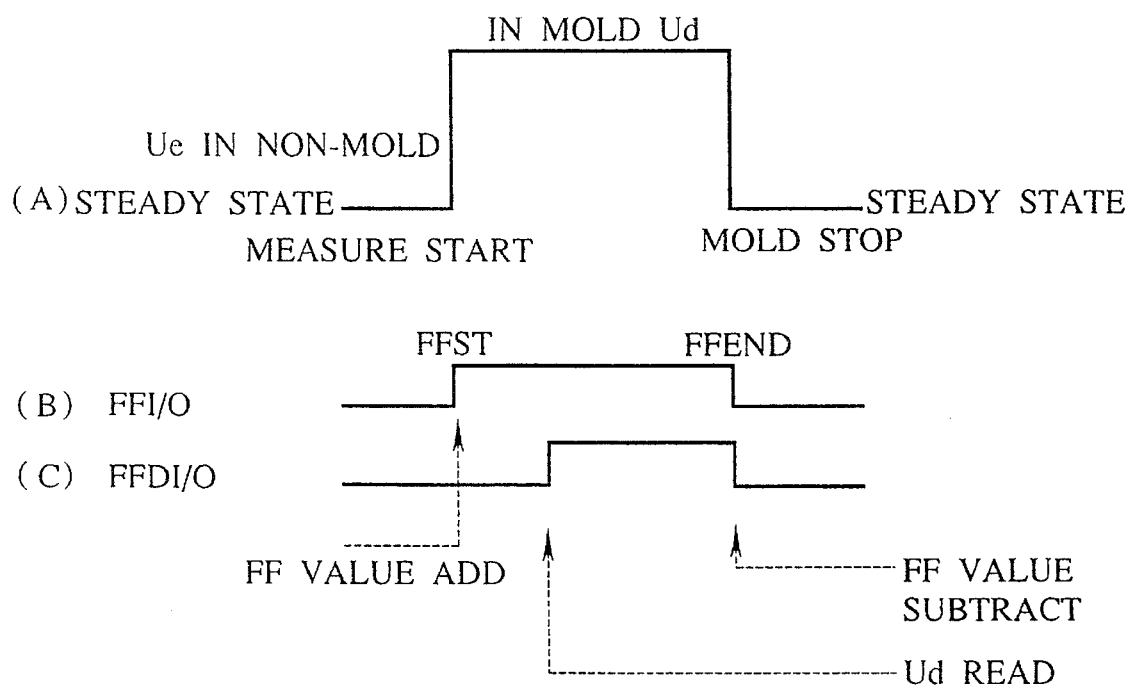
FIG. 6 is a timing chart showing the states where the feed-forward is added or subtracted to and from PiD value.

FIG. 6 shows the relationship obtained when the FF rate is added to or subtracted from the PiD value. In FIG. 6, (A) denotes the manipulated variable; (B) denotes the signal transmitted from the sequencer to the controller; and (C) denotes the signal indicative that the number of molded products reach a predetermined value.

Figure 8:
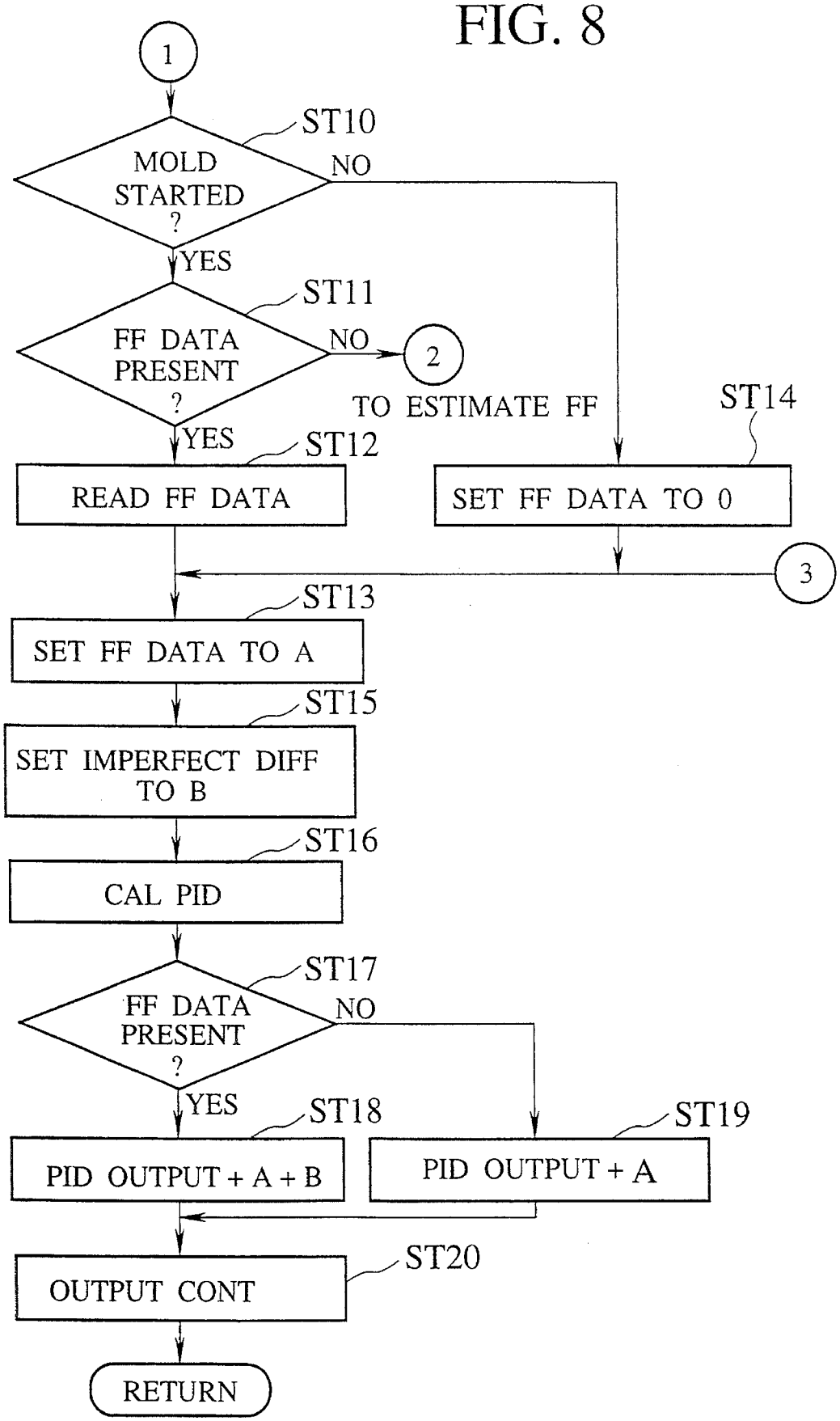
FIG. 8 is a flowchart showing another part of the processing flow of the embodiment of the present invention.
Figure 9:
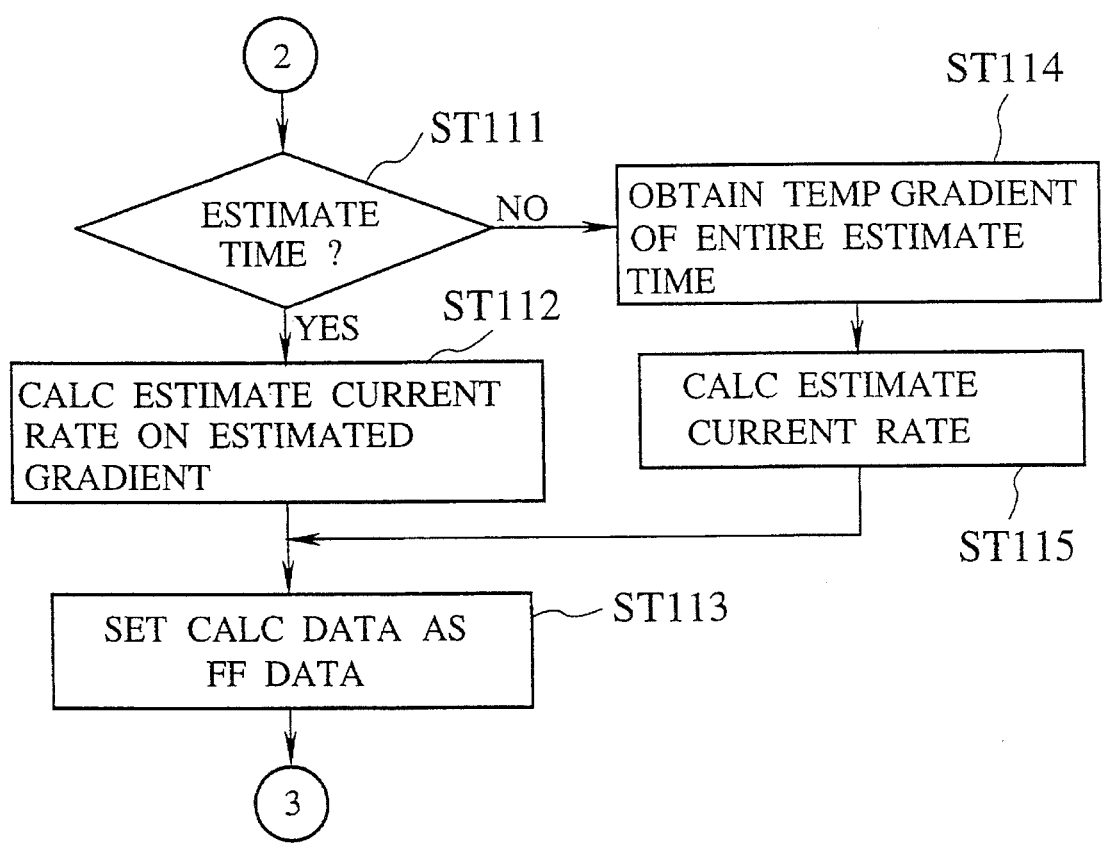
FIG. 9 is a flowchart showing the other part of the processing flow of the embodiment of the present invention.

With reference to flowcharts shown in FIGS. 7, 8 and 9, the operation of the embodiment will be explained.

Figure 7:
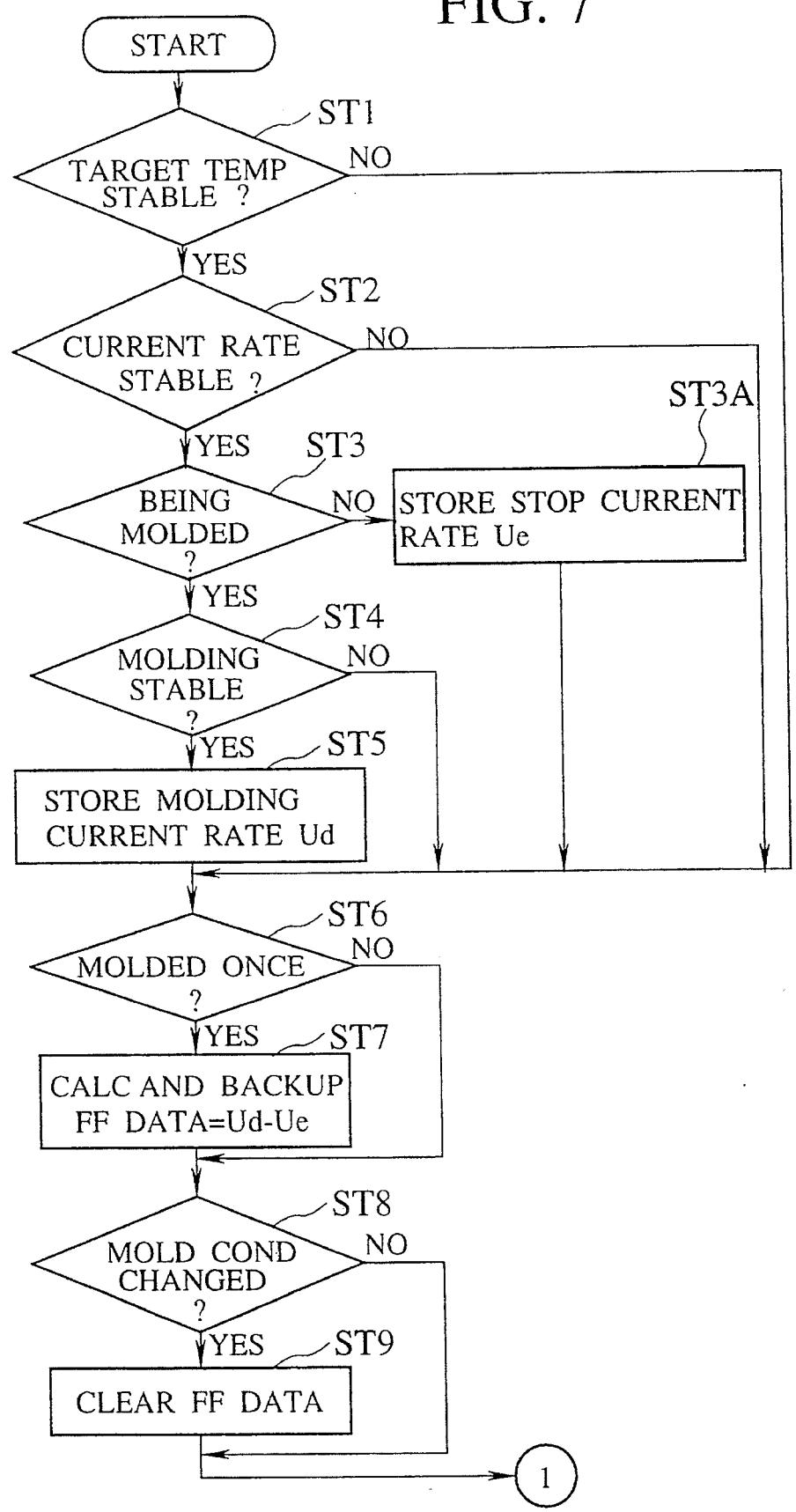
FIG. 7 is a flowchart showing a part of the processing flow of the embodiment of the present invention.

In ST1 of FIG. 7, the barrel temperature at the thermocouple measurement points are compared with the target temperature to check whether the barrel temperature is stable at the target temperature. If stable at the target temperature, it is discriminated whether the power (current rate) passed through the heater is stable or not (ST2). IF stable, it is discriminated whether the molding is being now made or not (ST3). If molding is now made, it is discriminated whether the molding is made stable or not (ST4). If stable, the current rate Ud of the heater during molding is stored (ST5), proceeding to a routine ST6 and after. Further, in the barrel temperature is not stable at the target value in ST1, steps ST2 to ST 5 are skipped, proceeding to a routine ST6 and after. If the current rate is not stable in ST2, step ST3 to ST5 are skipped, proceeding to a routine ST6 and after. If molding is not being made in ST3, the current rate Ue at stop is stored (ST3A), and steps ST4 and ST5 are skipped, proceeding to a routine ST6 and after. If molding is not stable in ST4, step ST5 is skipped, preceding to a routine ST6 and after.

In ST6, it is discriminated whether the injection molding operation is once completed or not; that is, it is discriminated whether the current injection molding conditions are the same as the preceding injection molding conditions. If the same, the learned feed-forward data (the difference of the current rate between the molding and non-molding) is calculated, and the calculated data is stored as the learned change manipulated variable. Therefore, it is possible to feed-forward control the heater section 3 of the injection molding machine 1 on the basis of the learned change manipulated variable. Of course, if the injection molding conditions are not the same (ST8), the learned change manipulated variable is cleared (ST9). However, if the injection molding conditions are the same, step ST9 is skipped, proceeding to step ST10 shown in FIG. 8. In ST10, when the injection molding operation starts, the presence or absence of the FF data as the learned change manipulated variable is confirmed (ST11), if present, the FF data are read (ST12), and the read FF data are set to a temporary memory area A (ST13). Further if the molding does not start in ST10, the FF data is set to [0] (ST14), and then set to the temporary memory area A (ST13). Further, if FF data is absent in ST11, it is discriminated whether the time is within the estimation time in step ST111 in FIG. 8. If within the estimation time, an estimated current rate (the estimated change manipulated variable) is calculated by the measurement gradient (ST112), the calculated estimated current rate data is used as the feed-forward control data (ST113). Further, if not within the estimation time in ST111, the temperature gradient during all the estimation time (ST114) is obtained. On the basis of the temperature gradient during all the estimation time, the estimated current rate is calculated (ST115). The calculated estimated current rate data is used as the data for feed-forward control data (ST113). The FF data thus obtained is set to the temporary memory area in ST13 shown in FIG. 8.

After the FF data has been set to the temporary area A as described above, imperfect differentiated data obtained by differentiating the FF data set to the temporary memory area A is set to the temporary memory area B (ST15). Then, if the PiD is calculated (ST16) and if the FF data is set (ST17), the data in the temporary areas A and B are added to the PiD output, so that the control output to the heating section 3 of the injection molding machine 1 can be generated (ST19), returning to ST1 in FIG. 7. Further, if the FF data is absent in ST17, the data in the temporary memory area A is added to the PiD output (ST20), so that the control output to the heating section 3 of the injection molding machine 1 can be generated (ST19), returning to ST1 in FIG. 7.

In the embodiment for controlling the barrel temperature in accordance with the processing flowcharts as shown, when the molding stop is shifted to the molding start, the following stages are executed:

(Stage 1)

The molding start signal is transmitted to the temperature control section. The molding start signal can be discriminated on the basis of such condition that the automatic mode and measurement operation start; the screw is moved; and the power is increased.

(Stage 2)

The same molding products (the same plasticizing conditions) are discriminated by the temperature control section. The molding conditions are discriminated on the basis of the injection cycling time (TR1+TR3+TR4), the screw revolution speed, the measurement stoke, and the set temperature value. However, the same conditions are decided in a predetermined allowable range.

(Stage 3)

a) When judged as the same molding products (the same plasticizing conditions are discriminated), the preceding learned value is read out and added to the set manipulated variable. The addition method is to add the imperfect differentiation and the simple addition. The imperfect differentiation is calculated by use of a constant and D of the PiD parameters of the ordinary control.

b) When Judged as the initial molding products, the estimated value is read from the estimation table and added to the set manipulated variable as an output. The addition method is to add the imperfect differentiation and the simple addition. The imperfect differentiation is calculated in the same way as in Item (a) above.

The appropriate estimated values are determined per each M/C size on the basis of the test results, and further listed in a table stored in the temperature control section. Further, the table is of changeable type.

(Stage 4)

The stable molding signal is transmitted from the sequencer to the temperature control section. The learned manipulated variable is obtained on the basis of the current manipulated variable and the variable obtained immediately before the molding start at this timing and under temperature conditions. The timing is generated from the sequence controller when a predetermined number of cycles have been executed. The reason why the number of molding cycles are determined is that this is the most suitable to determine that the temperature is stable under various molding conditions.

For instance, when the amount of resin increases, the molding time per cycle increases, so that it takes a long time to obtain a stable temperature. When determined by the number of cycles, however, the time at which the stable temperature is obtained is also lengthened.

In addition to the timing transmitted from the sequence section, the conditions of the temperature control section at that time are added to make the timing effective. The conditions are that the temperature deviation lies within a predetermined range and further the output of the manipulated variable is stable within a predetermined fluctuation range.

(Stage 5)

When the molding status changes to the molding stop status, the molding start signal as defined in Item (1) is turned from On to Off. In response to this signal, the learned or estimated manipulated variable and its imperfect differentiated rate is subtracted from the manipulated variable. The obtained manipulated variable is outputted.

As described above, according to the present invention, in order to control the barrel temperature, the feed-forward control is enabled together with the feedback control. At the same time, further, the feed-forward control can be switched automatically from the estimated change manipulated variable to the learned change manipulated variable or vice versa. Further, when the same products are molded continuously, since the temperature is feed-forward controlled on the basis of the learned change manipulated variable, without adjusting the disturbance suppression, it is possible to execute the barrel temperature control in such a way that the disturbance suppression characteristics can be always optimized.

What is claimed is:

1. A barrel temperature control apparatus for an injection molding machine having a sequence-controlled injection molding operation in which resin supplied to a barrel is is mixed and melted, the barrel temperature control apparatus comprising:

a barrel heater for heating the barrel;

temperature detecting means for detecting the temperature of the barrel; and barrel temperature control means for determining a temperature deviation between the detected temperature and a target temperature, and for feedback controlling the barrel heater on the basis of a manipulated variable obtained from the temperature deviation, the barrel temperature control means including molding operation determining means for determining start and stop of the injection molding machine based on the sequence-controlled injection molding operation, first feed-forward control means for estimating a disturbance value based on one of an increase and decrease in temperature fluctuations of the barrel due to a disturbance at an initial response stage of the barrel heater at each start and stop of the injection molding machine, and for feed-forward controlling the barrel heater based on an estimated change manipulated variable calculated from said estimated disturbance value, second feed-forward control means for learning a first manipulated variable of the barrel heater during the injection molding operation and a second manipulated variable of the barrel heater during the stop of the injection molding machine, and for feed-forward controlling the barrel heater based on learned change manipulated variable obtained from the first and second manipulated variables, molding condition determining means for determining whether current injection molding conditions and preceding injection molding conditions are identical or different during the injection molding operation based on the sequence-controlled injection molding operation, and selecting means for selecting said second feed-forward control means when the current injection molding conditions are identical to those of the preceding injection molding conditions, and for selecting said first feed-forward control means when the current injection molding conditions are different from those of the preceding injection molding conditions.

2. The barrel temperature control apparatus of claim 1, wherein said first feed-forward control means releases the feed forward control of the barrel heater when a fluctuation range of the barrel temperature is less than a predetermined value within a predetermined time.

3. The barrel temperature control apparatus of claim 1, wherein said first feed-forward control means is operated on a condition that an increase and decrease of the estimated change manipulated variable are limited within a predetermined range, after a predetermined time has elapsed.

4. The barrel temperature control apparatus of claim 1, wherein said second feed-forward control means is operated on a condition that an increase and decrease of the learned change manipulated variable are limited within a predetermined range.

* * * * *